(12) United States Patent
Regina et al.

(10) Patent No.: US 11,657,601 B2
(45) Date of Patent: May 23, 2023

(54) METHODS, DEVICES AND SYSTEMS FOR COMBINING OBJECT DETECTION MODELS

(71) Applicant: Vade USA inc., San Francisco, CA (US)

(72) Inventors: Mehdi Regina, Montréal (CA); Maxime Marc Meyer, Montreal (CA); Sébastien Goutal, San Francisco, CA (US)

(73) Assignee: VADE USA, INCORPORATED, San Francisco, CA (US)

( * ) Notice: Subject to any disclaimer, the term of this patent is extended or adjusted under 35 U.S.C. 154(b) by 0 days.

(21) Appl. No.: 17/723,156

(22) Filed: Apr. 18, 2022

(65) Prior Publication Data

US 2023/0030330 A1 Feb. 2, 2023

Related U.S. Application Data

(63) Continuation of application No. 16/712,713, filed on Dec. 12, 2019, now Pat. No. 11,334,771.

(51) Int. Cl.
| | | |
|---|---|---|
| *G06F 16/535* | (2019.01) | |
| *G06F 16/55* | (2019.01) | |
| *G06V 10/82* | (2022.01) | |
| *G06N 3/08* | (2023.01) | |
| *G06F 18/2411* | (2023.01) | |

(52) U.S. Cl.
CPC .......... *G06F 16/535* (2019.01); *G06F 16/55* (2019.01); *G06F 18/2411* (2023.01); *G06N 3/08* (2013.01); *G06V 10/82* (2022.01)

(58) Field of Classification Search
None
See application file for complete search history.

(56) References Cited

U.S. PATENT DOCUMENTS

| | | | |
|---|---|---|---|
| 10,834,128 B1* | 11/2020 | Rajagopalan | ......... H04L 51/212 |
| 2013/0051676 A1* | 2/2013 | Wehnes | ................. G06F 18/24 |
| | | | 382/190 |
| 2020/0036751 A1* | 1/2020 | Kohavi | ............... H04L 63/1416 |
| 2020/0388030 A1* | 12/2020 | Steelberg | ............. G06V 10/764 |
| 2021/0144174 A1* | 5/2021 | N | ........................ H04L 63/1433 |
| 2021/0166053 A1* | 6/2021 | Raudies | ............... G06V 10/426 |
| 2022/0005332 A1* | 1/2022 | Metzler | ............ G08B 13/19682 |

* cited by examiner

*Primary Examiner* — Bernard Krasnic
(74) *Attorney, Agent, or Firm* — Young Law Firm, P.C.

(57) ABSTRACT

A computer-implemented method of detecting logos in a graphical rendering may comprise detecting, using a first and a second trained object detector, logos in the graphical rendering and outputting a first and a second list of detections and filtering, using at least a first and a second prior performance-based filter, the received first and second lists of detections into a first group of kept detections, a second group of discarded detections and a third group of detections. Detections in the third group of detections may be clustered in at least one cluster comprising detections that are of a same class and that are generally co-located within the electronic image. A cluster score may then be assigned to each cluster. A set of detections of logos in the graphical rendering may then be output, the set comprising the detections in the first group and a detection from each of the clusters whose assigned cluster score is greater than a respective threshold.

18 Claims, 9 Drawing Sheets

| Input: RGB image $Im$ | Output: List of detections |
|---|---|
| A tensor of shape *width*, *height*, *depth*:<br>• *width*: number of pixels along image width, where *width* ≥ 2<br>• *height*: number of pixels along image height, where *height* ≥ 2<br>• *depth*: the number of channels. Generally, there are 3 channels, each corresponding to a color (Red, Green, Blue).<br><br>We define each element of the tensor as $x_{ijz}$ an integer ∈ [0, 255] being the intensity of the image at pixel location $i$ (integer ∈ [1, *width*]), $j$ (integer ∈ [1, *height*]), and $z$ (integer ∈ [1,3]). | List of detections: $[D_1, D_2, ..., D_d]$<br>Each detection $D_i$ with $i$ in the set $\{1, d\}$ is a tuple $(cls, s, b)$ such that:<br>• $cls$ is the object class in the set $CLS$ (see Table 2)<br>• $s$ is the class confidence score (a float ∈ [0,1])<br>• $b$ is the bounding box location in the pixel space usually defined by its opposite corners<br>(e.g. $b = (x_1, x_2, y_1, y_2)$ a tuple of integers with:<br>  ○ $x_1$ ∈ [1, *width* − 1];<br>  ○ $x_2$ ∈ [2, *width*];<br>  ○ $y_1$ ∈ [1, *height* − 1];<br>  ○ $y_2$ ∈ [2, *height*];<br>• A bounding box has the same location along each channel. |

*FIG. 1*

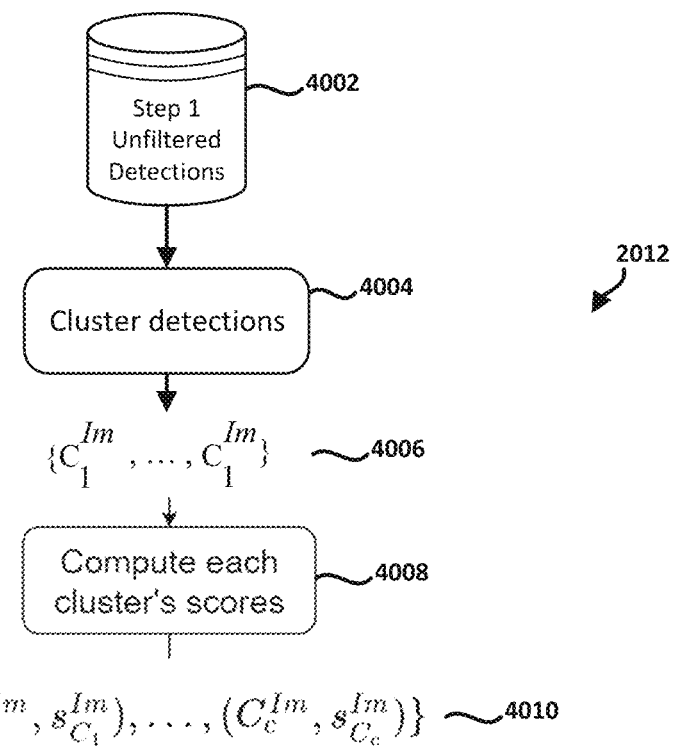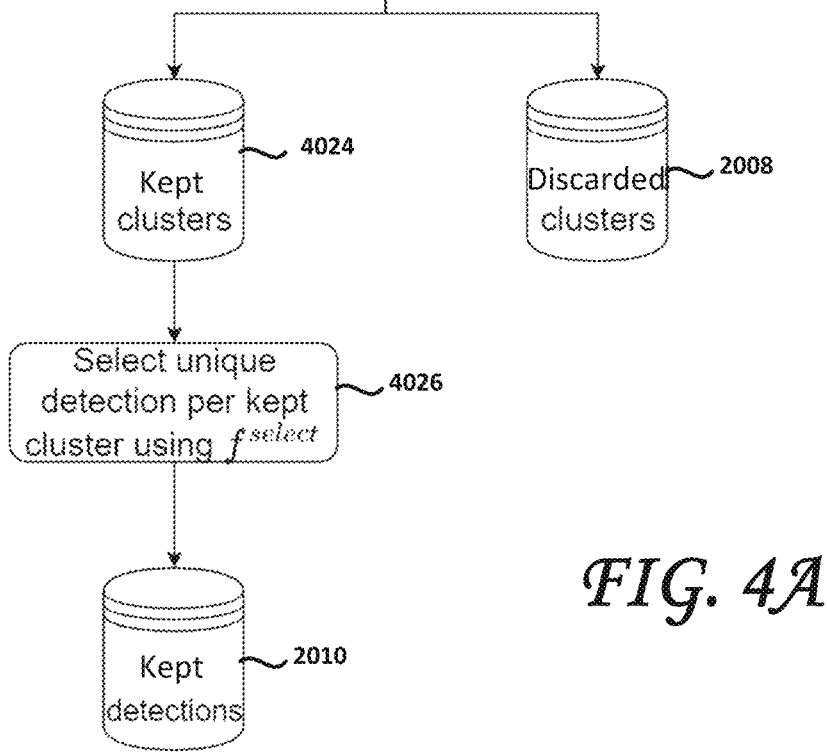
FIG. 4A

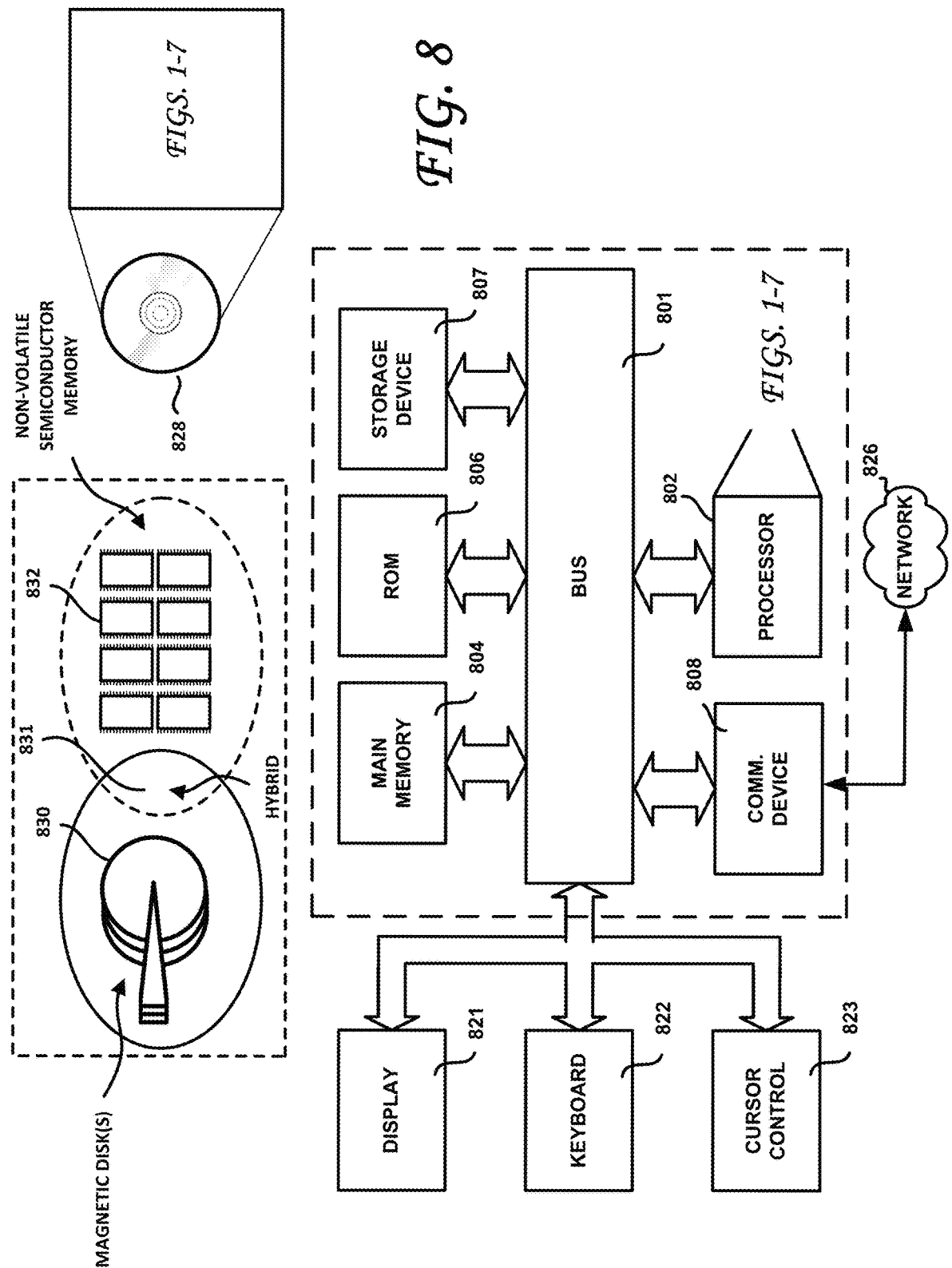

METHODS, DEVICES AND SYSTEMS FOR COMBINING OBJECT DETECTION MODELS

BACKGROUND

Phishing attacks generally involve an attacker attempting to steal sensitive information using fraudulent webpages that impersonate the legitimate brand webpages. As such, those fraudulent webpages mimic the legitimate ones, including one or more logos of the impersonated brands that are present in the legitimate pages. As the phishers's work product increases in quality, it has become increasingly difficult to detect fraudulent webpages from the legitimate ones.

BRIEF DESCRIPTION OF THE DRAWINGS

FIG. 1 is a table showing inputs and outputs of an object detector, according to an embodiment.

FIG. 4A is a block diagram of further aspects of a computer-implemented method of detecting logos in a graphical rendering, showing aspects of filtering at prediction time, according to one embodiment.

FIG. 8 is a block diagram of a computing device suitable for carrying out a computer-implemented method according to an embodiment and a computing device configured according to an embodiment.

DETAILED DESCRIPTION

Figure 2:
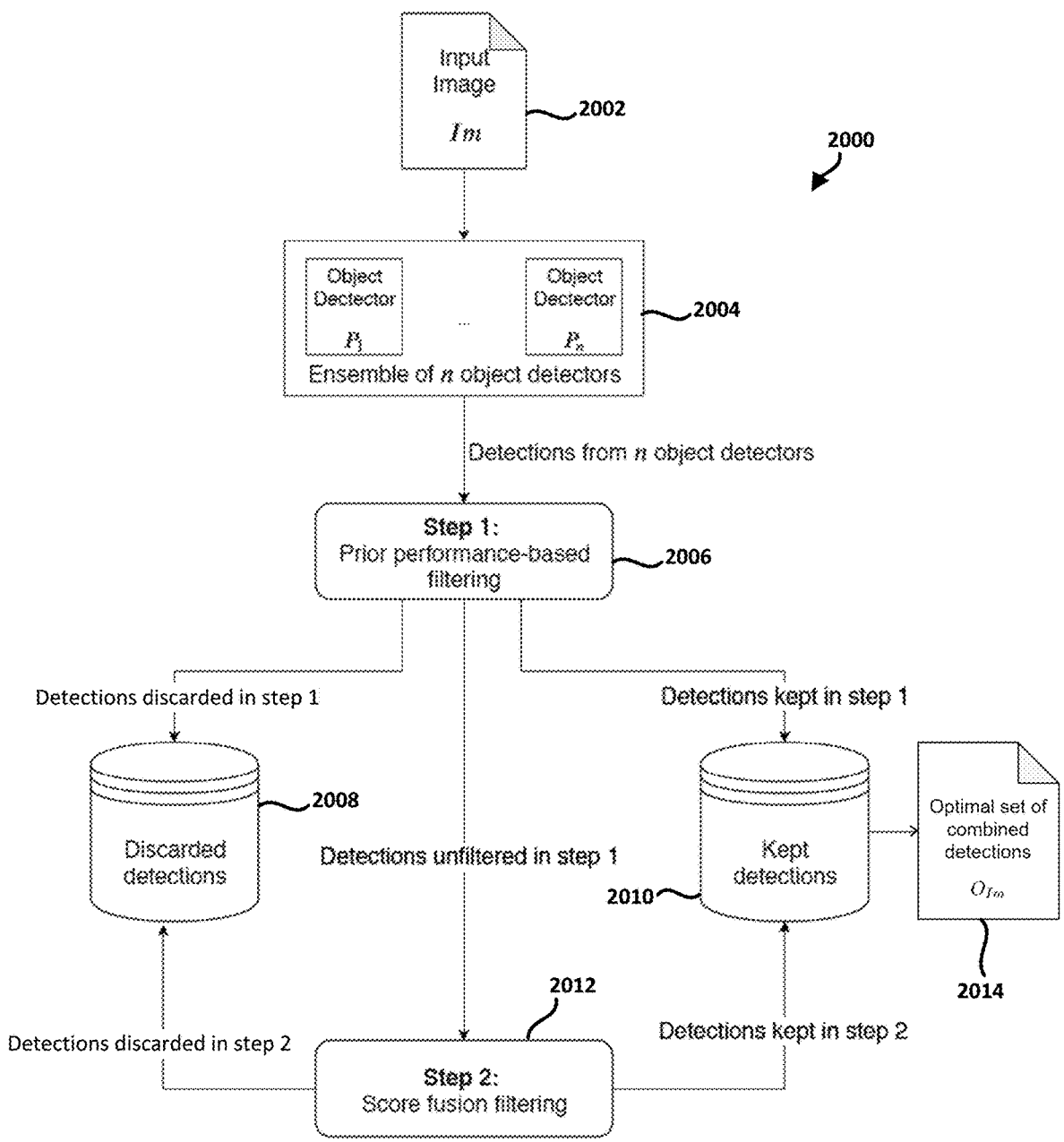
FIG. 2 is a block diagram of a computer-implemented method of detecting logos in a graphical rendering, according to one embodiment.

Embodiments are drawn to computer-implemented methods and systems for combining object detection models, and more specifically the combination of logo detection models, to output a better combined detection given an input image. These computer-implemented methods and systems may be used to detect brand logos in images and help with the detection and characterization of phishing attacks where an attacker attempts to steal sensitive information using fraudulent webpages impersonating the legitimate brand webpages. Those fraudulent webpages mimic the legitimate ones, including one or more logos of the impersonated brands that are present in the legitimate pages. By applying logo detection to images representing webpages, emails or any other kind of electronic documents, a better characterization of the phishing attempt may be derived and the phished brand may be detected with a greater degree of certainty. The term "logo", as used herein, includes within its scope any graphic mark, emblem, or symbol used to aid and promote public identification and recognition. It may be of an abstract or figurative design or include the text of the name it represents as in a wordmark. The term "logo" also includes most any graphical representation of most anything (and slight variations thereof), as the object detectors referred to herein may be trained with most any kind of annotated training images.

Object detection is a machine learning task for which an estimator (referred here as an object detector) learns, given annotated images, to detect objects on new images, such that each object detected on an image is associated to an object class (typically the object type), a confidence score (typically a float in the $[0,1]$ range), and its position in the image (e.g., the coordinates of the bounding box in the pixel's space).

A number of research efforts have been made to improve the accuracy of single estimators for a specific image processing task. Similarly, research has been carried out to determine the manner in which multiple estimators may be combined to improve performance, resulting in new "ensemble" models, such as a "Random Forest", which is a combination of decision trees. Embodiments, therefore, are drawn to computer-implemented methods and systems for combining several estimators' predictions in the context of object detection.

Estimator Combination and Logo Detection

Logo detection is a particular case of object detection. Object detection in computer vision is both a classification and regression problem. Indeed, given an input image, the objective is to output detections; that is, to predict locations of bounding boxes containing target objects and their corresponding classes. Detections are based on constraints induced by the annotation strategy and the algorithm's loss function. A detection's bounding box may be rectangular, may contain only one object and may be of similar size as the object it contains. The input and output of an object detection algorithm is detailed in the table below:

TABLE 1

| Definition of inputs and outputs of an object detector | |
|---|---|
| Input: RGB image Im | Output: List of detections |
| A tensor of shape width, height, depth: width: number of pixels along image width, where width ≥ 2 height: number of pixels along image height, where height ≥ 2 depth: the number of channels. | List of detections: $[D_1, D_2, \ldots, D_d]$ Each detection $D_i$ with i in the set $\{1, d\}$ is a tuple (cls, s, b) such that: cls is the object class in the set CLS (see Table 2 - Definitions) s is the class confidence score (a float ∈ |

TABLE 1-continued

Definition of inputs and outputs of an object detector

| Input: RGB image Im | Output: List of detections |
|---|---|
| Generally, there are 3 channels, each corresponding to a color (Red, Green, Blue). | [0, 1])<br>b is the bounding box location in the pixel space usually defined by its opposite corners |
| We define each element of the tensor as $x_{ijz}$ an integer $\in$ [0, 255] being the intensity of the image at pixel location i (integer $\in$ [1, width]), j (integer $\in$ [1, height]), and z (integer $\in$ [1, 3]). | (e.g. b = $(x_1, x_2, y_1, y_2)$ a tuple of integers with:<br>$x_1 \in$ [1, width – 1];<br>$x_2 \in$ [2, width];<br>$y_1 \in$ [1, height – 1];<br>$y_2 \in$ [2, height];<br>A bounding box has the same location along each channel. |

Similarly, to other computer vision tasks, object detection task generally relies on Convolutional Neural Networks (CNNs). CNNs are a class of deep neural networks, most commonly applied to analyzing visual imagery. For example, CNNs may include the SSD version of the ResNet-50 and VGG-16 algorithms. According to one embodiment, a CNN may be used to detect logos. Pixm, Inc., for example, includes in their product pipeline a CNN to detect logos and icons in order to flag suspicious websites or emails. Research in the field is also active and multiple methods based on CNNs have been proposed recently to improve object detection performance.

A well-known approach in machine learning to improve performance on a given task is to combine different estimators (e.g. SVM, CNN). Indeed, combining estimators allows to reduce generalization error. Empirically, estimators ensembles tend to yield better results when there is a significant diversity among estimators (i.e. when estimators errors are not correlated). Diversity between estimators can be increased using various levers such as the training data (e.g. data augmentation, bagging), the estimator algorithm (e.g. SVM, Logistic Regression) or the architecture and training parameters with neural networks. Proposals have been made, for example, to create a set of diverse CNNs in order to combine them and accurately classify objects.

Besides estimators diversity, the combination method also impacts performance of the estimators ensemble. Different methods have been proposed to combine estimators such as voting, the Demptser-Shafer theory, and other machine learning algorithms. Other methods such as boosting tackles both estimators diversity and combination.

In the context of object detection where each estimator (object detector) can make several candidate detections, each of them with their own location (see Table 1-Definition of inputs and outputs of an object detector), specific combining methods have been proposed, which make use of the overlap between detections from different object detectors. For instance, detections using a machine learning algorithm may be combined to rank candidate detections on each image. The ranking algorithm's features includes information regarding the degree to which each detection overlaps with others and the object-object relations likelihood. Overlapping low-rank detections are discarded.

Other methods to cluster detections are based on overlap, with a score being computed for each cluster. In order to compute the cluster's score, such methods combine scores given by detections within clusters using, for instance, the Demptser-Shaffer theory. Once each cluster has been assigned a score, they may be filtered and redundant detections may be removed according to some criteria (e.g. non-max suppression).

One embodiment is configured to combine detections from multiple object detectors through successive filtering operations in order to output an optimal set of combined detections. The resulting set of combined detections performs better than any set outputted by object detectors taken individually. Indeed, one embodiment of the present computer-implemented method may comprise two filtering steps, such that the optimal set of detections is generated at the end of the second step. These steps include a first step (Step 1 herein) of prior performance-based filtering and a second step (Step 2 herein) of score fusion filtering.

FIG. 2 is a flowchart of an embodiment of a computer-implemented method 2000 for combining object detection models. As shown therein, block 2002 calls for an input image Im 2002 to be provided as input to an ensemble (e.g., a plurality) of n trained object detectors $P_i \ldots P_n$, referenced at numeral 2004. The respective detections from the n object detectors may then be filtered in the aforementioned Step 1 using prior performance-based filtering, shown at 2006. According to one embodiment, one result of the prior performance filtering may include one or more of the detections being discarded after Step 1, as shown at 2008. One or more results of prior performance-based filtering may include one or more detections being kept after Step 1, as shown at 2010, without any further filtering in Step 2. According to one embodiment, the remaining detections that are neither immediately discarded at 2008 nor kept at 2010 as a result of the prior performance-based filtering of Step 1, may be input to Step 2, score fusion filtering, as shown at 2012. Those detections that remain after score fusion filtering 2012 in Step 2 may then be added to the kept detections at 2010 and contribute to the optimal set of combined detections $O_{Im}$, as shown at 2014. The others are added to the discarded set, as shown at 2008.

Definitions

The following data are defined:

TABLE 2

Definitions

| CLS | The set of class cls that are learned by the object detectors. Detection made by those object detectors have their class included in this set. |
|---|---|

TABLE 2-continued

| | Definitions |
|---|---|
| $P_i$ | A trained object detector on a given object detection task. An object detector processes images and outputs detections as defined in Table 1-Definition of inputs and outputs of an object detector |
| $P = \{P_1, \ldots, P_n\}$ | A set of n trained object detectors $P_i$ on the same object detection task. |
| Im | An image as defined in Table 1-Definition of inputs and outputs of an object detector |
| $D_k^{P_i,Im} = (cls_k^{P_i,Im}, s_k^{P_i,Im}, b_k^{P_i,Im})$ | A candidate detection made by object detector $P_i$ for image Im as defined in Table 1-Definition of inputs and outputs of an object detector |
| $D_{P_i,Im} = \{D_1^{P_i,Im}, \ldots, D_l^{P_i,Im}\}$ | The set of l candidate detections $D_k^{P_i,Im}$ made by object detector $P_i$ for image Im. It is important to note that l may be different for each image given an object detector and that l may even be 0 for some images. |
| $l_{P_i,Im} = card(D_{P_i,Im})$ | The number of detections in the set of detections $D_{P_i,Im}$. |
| $O_{Im} = \{D_1^{Im}, \ldots, D_L^{Im}\}$ | The optimal set i.e. set of L optimal candidate detections for image Im. |
| $L_{Im} = card(O_{Im})$ | The number of detections in the optimal set of detections $O_{Im}$. |
| V | A validation set made of images with annotated bounding boxes corresponding to the ground truth objects present in the images. |
| $f^{overlap}$ | The metric to measure the overlapping between two detections. Two detections $D_1$ and $D_2$ defined by their respective tuples $(cls_1, s_1, b_1)$ and $(cls_2, s_2, b_2)$ are overlapping if the area of the intersection of their bounding boxes $(b_1, b_2)$ is not null. The overlapping metric takes as input two detections bounding boxes and outputs an overlapping score. Different metrics exist to measure the overlapping such as the Intersection Over Union also known as IoU (29) (30) defined as follow: $$IoU = \frac{area(b_1 \cap b_2)}{area(b_1 \cup b_2)};$$ area$\{b_1 \cap b_2\}$ denotes the area of the intersection of bounding boxes, area $(b_1 \cup b_2)$ denotes the area of the union of bounding boxes. |

The embodiments described and shown herein may comprise combining the detections outputted by several object detectors on one image such that: $L_{Im} \leq \sum_{i=1}^{n} l_{pi,Im}$. The detections contained in the optimal set $O_{Im}$ are not necessarily all comprised of the union of all detections of each object detectors for the image Imp. Indeed, it is possible that two or more detections are combined to create a new detection, and in this case the two or more individual detections that were combined are discarded. Thus, the number of optimal detections is less than or, at most, equal to the total number of detections outputted by the different object detectors for the image lm.

The following two phases are defined:

| Parameters setting time | At parameters setting time, we use annotated images from the validation dataset V to determine Step 1 and Step 2 parameters allowing to filter and combine detections. The method used to determine parameters' value is described in Step 1 and in Step 2. |
|---|---|
| Prediction time | At prediction time, the set of n object detectors P takes as input one or several images. These images do not belong to the validation dataset V and have never been seen by the object detectors. At prediction time, Step 1 and Step 2 parameters have already been fixed. |

Prior Performance-Based Filtering

According to one embodiment, Step 1, shown at 2006 in FIG. 2, may comprise filtering detections made on an input image Im based on each object detector's performance and the mutual overlap of their respective detections. The thresholds and parameters used to filter detections in Prior performance-based filtering, may include the following:

| prior knowledge = $\{s_{P_1}^{step1}, \ldots, s_{P_n}^{step1}\}$ | A set of confidence score thresholds $s_{P_i}^{step1}$, each object detector $P_i$ having one associated confidence score threshold. Those thresholds are determined at Parameters setting time based on the performance of each object detector on a validation dataset V as detailed in Prior knowledge construction. |
|---|---|
| overlap* | An overlapping threshold determined by an expert. This can be done at parameter setting time using, for example, a trivial iteration process, updating the value of overlap* until an optimal one is determined. |

Figure 3:
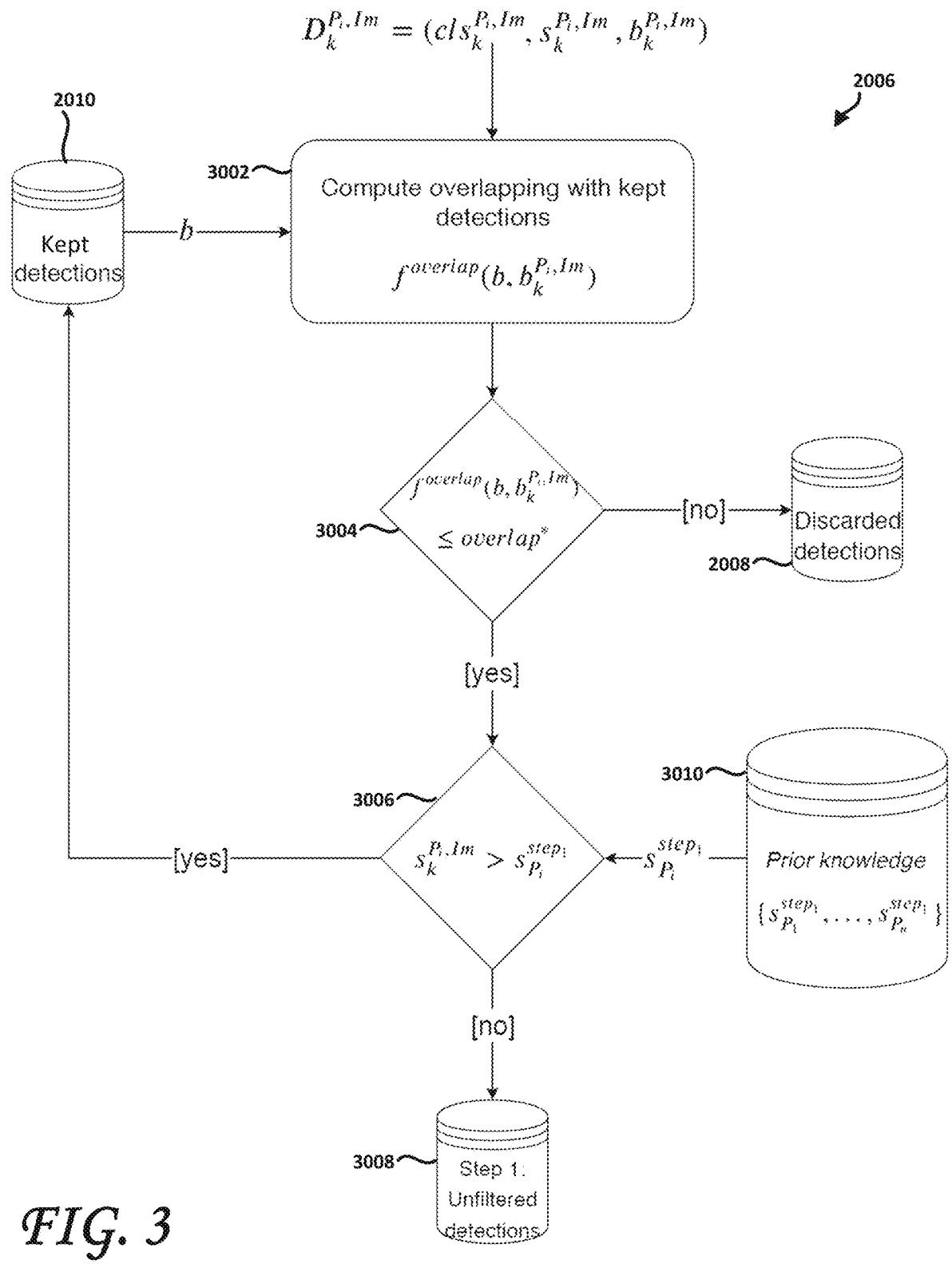
FIG. 3 is a block diagram of further aspects of a computer-implemented method of detecting logos in a graphical rendering, according to one embodiment, showing filtering at prediction time.

FIG. 3 is a diagram illustrating aspects of Step 1 of the present computer-implemented method, according to one embodiment. More specifically, FIG. 3 illustrates the manner in which detections are first filtered at prediction time. As represented in FIG. 3, filtering at Step 1 (reference 2006 in FIG. 2), according to one embodiment, may be performed as follows. We consider as an input the set of all detections $\{D_{p,Im}, \ldots, D_{pn,Im}\}$ made by all object detectors $\{P_i, \ldots, P_n\}$ on image Im. Each detection may be filtered using, for example, two rules:

Each detection $D_k^{pi,Im}$ may be first compared to the set of kept detections (also shown at 2010 in FIG. 2, this set is initially empty). For each detection already present in the set of kept detections 2010, the overlapping score $f^{overlap}$ $(b_k^{pi,Im})$ between the bounding box $b_k^{i,im}$ of detection $D_k^{pi,Im}$ and the bounding box b of the kept detection 2010 may be computed using $f^{overlap}$, as shown at 3002 in FIG. 3. This overlapping factor may then be compared to the overlapping threshold overlap*, as shown at 3004. If, for any detection in the set of kept detections, the overlapping factor is strictly greater than overlap*, the detection $D_k^{i,Im}$ may be discarded (i.e. added to the set of discarded detections 2008). Otherwise, the present computer-implemented method may proceed with the filtering of detection $D_k^{pi,Im}$.

In a second time, the class confidence score $s_k^{pi,Im}$ of detection $D_k^{pi,Im}$ may be compared, as shown at 3006, to a threshold $s_{pi}^{step1}$ (obtained from prior knowledge database 3010) relative to the performance of the object detector $P_i$ that made the detection $D_k^{pi,Im}$. If $s_k^{pi,Im}$ is strictly greater than $s_{pi}^{step1}$, then the detection $D_k^{pi,Im}$ may be added to the set of kept detections 2010. Otherwise it may be added to the set of unfiltered detections 3008. This second set may then be further analyzed (as described in Score Fusion Filtering.

We now describe bounding box filtering through the overlapping criteria as well as giving further details on how the prior knowledge database 3010 can be built.

Overlapping Based Rules

The objective of the first stage of detections filtering is to discard redundant or incorrect detections based on their overlap with detections that have been added to the kept detection set 2010, i.e. detections expected to be correct (once again, this set is initially empty).

A detection $D_1$ defined by $(cls_1, s_1, b_1)$ is redundant if its bounding box overlaps significantly with the bounding box of a detection $D_2$ defined by $(cls_2, s_2, b_2)$ expected to be correct (present in the kept detection set 2010) such that $f^{overlap}(b_1, b_2) > \text{overlap}^*$ and if the two detections predict the same object class, i.e. $cls_1 = cls_2$. Under such conditions, $D_1$ and $D_2$ are likely to detect the same object.

A detection $D_1$ defined as $(cls_1, s_1, b_1)$ is incorrect if its bounding box overlaps significantly with the bounding box of a detection $D_2$ defined by $(cls_2, s_2, b_2)$ expected to be correct (present in the kept detection set 2010) such that $f^{overlap}(b_1, b_2) > \text{overlap}^*$ and if the two detections recognize different object classes, i.e. $cls_1 \neq cls_2$. Indeed, in this case, $D_1$ and $D_2$ have detected an object at the same spatial position on the image but differ in their prediction of the object class. As $D_2$ is expected to be correct (already present in the kept detection set 2010), $D_1$ must be discarded; e.g., added to the discarded detections store 2008. The overlapping metric $f^{overlap}$ (e.g. IoU) and the overlapping threshold overlap* (e.g., IoU=0.5) may be determined by an expert. In particular, once $f^{overlap}$ has been chosen, the overlapping threshold overlap* may be determined using a trivial iteration process on the value $f^{overlap}*$ for example.

Prior Knowledge Construction

In order to build the prior knowledge database 3010 in FIG. 3, we study the performance of each detector $P_i$ on a validation dataset V as a function of the class confidence score. This set of images is supposed to be the ground truth, i.e. each image in this dataset V has an annotation that can be trusted (made by an expert for example).

We define $D_{pi}$ as the union of all detections made by $P_i$ on V, i.e. $D_{pi} = \cup_j D_{pi, Imj}$, with $I_{mj} \in V$. For a chosen value of class confidence sa (e.g. $s_a=0.5$), we keep the detection subset $D_{pi}(s_a)$ from $D_{pi}$ such that, for all detections $D_k^{pi}$ defined by $(cls_k^{pi}, s_k^{pi}, b_k^{pi})$ belonging to $D_{pi}(s_a)$, confidences are greater than or equal to $s_a$, i.e. $s_k^{pi} \geq s_a$. Following Table 1-Definition of inputs and outputs of an object detector, we note $1_{pi}$ the number of detections in the set $D_{pi}$, and $1_{pi}(s_a)$ the number of detections in $D_{pi}(s_a)$.

The performance related to the score $s_a$ and detector $P_i$ may then be computed using the performance metric $f^{Perf}$. $f^{Perf}$ takes as input the detection subset $D_{pi}(s_a)$ and the ground truth annotations in V.

For each detector, this operation may be repeated several times with different $s_a$ values. For instance, as class confidences scores are comprised in [0,1], we may choose $s_a$ values from 0 to 1 with a step of 0.05. We can then plot performance graphs for each detector with $s_a$ values as abscissa and the corresponding performances as ordinate.

Based on these performance graphs, we can determine the set of confidence thresholds $\{s_{p1}^{step1}, \ldots, s_{pn}^{step1}\}$ such that for detector $P_i$, we can consider that all detections $D_k^{pi}$ with class confidences greater than or equal to $s_{pi}^{step1}$ (i.e. detections in $D_{pi}(s_{pi}^{step1})$) are expected to be correct. To do so, we define the performance that a detector is expected to achieve in order to output correct detections. Thus, the following parameters may be defined:

| | |
|---|---|
| $f^{perf}$ | The performance metric is a function taking as input the validation dataset V and a detection set on V (i.e. $\cup_j D^{Pi, Imj}$), and outputs a performance score. |
| perf* | The performance objective of an object detector $P_i$ on V above which detections from $P_i$ are expected to be correct. |
| l* | The minimum number of detections that must contain the subset $D_{P_i}(s_a)$ used to compute the performance on V. |

For instance, we define $f^{Perf}$ to be the precision in information retrieval settings. In these settings, precision may be defined as follow:

$$\text{Precision} = \frac{TP}{TP + FP}.$$

TP is the number of True Positives, i.e. the number of correct detections; FP the number of False Positives, i.e. the number of incorrect detections. We may choose perf*=0.99 as the precision on V above which an object detector $P_i$ is expected to output correct detections. Indeed, if a detector $P_i$ has its precision above 0.99 on V, we may expect that detections from $P_i$ are correct at prediction time.

We also introduce l* to mitigate the risk of generalizing the performance observed on a small subset of detections. Indeed, $1_{pi}(s_a)$ may be very small for a high value of $s_a$. The smaller the subset of detections the more the computed performance is subject to variations and thus the less it is reliable. We may fix, for instance, l*=50.

With perf*and l*fixed, the prior knowledge database 3010 may be built as follow at parameters setting time: for each performance graph $Graph_i$ we search for the smallest $s_a$ among the values chosen such that the performance of the detection subset given by $s_a$ is strictly greater than perf* and the number of detections in the subset is strictly greater than l*, i.e. $f^{perf}(D_{pi}(s_a), V) > \text{perf}^*$ and $1_{pi}(s_a) > 1^*$. We note $s_{P_i}^{step1}$ the smallest s, value satisfying the performance and minimum detection number conditions on $Graph_i$. If $s_{P_i}^{step1}$ exists, it is added to the prior knowledge database 3010 otherwise a value of $s_{pi}^{step1}=1.0$ is added to the prior knowledge database (such a value cannot be reached as class confidence scores are comprised in [0,1] and the inequality is strict, as shown in 3006).

Score Fusion Filtering

The second step of filtering (i.e., Step 2 2012 in FIG. 2) takes as input the set of unfiltered detections that have not been kept or discarded by Step 1 rules, i.e. Step 1 unfiltered detections 2006.

We define the following notations:

| | |
|---|---|
| $C_x^{\prime Im}$ | An uncleaned cluster of detections of the same class x. A cluster is a group of unfiltered detections on an image Im. A cluster contains at least one detection. Uncleaned clusters may contain several detections from an object detector. |

| | |
|---|---|
| $C'_{Im} = \{C'^{Im}_1, \ldots, C'^{Im}_c\}$ | For instance, the cluster $C'^{Im}_x$ may contain the set of detections $\{D_3^{P_2, Im}, D_5^{P_2, Im}, D_2^{P_4, Im}\}$.<br>Part 1: Cluster detections - details how unfiltered detections are grouped to form clusters.<br>The set of all uncleaned clusters $C'^{Im}_x$ on the image Im.<br>The number c depends on the input set of Step 1 unfiltered detections and the clustering method used. c is at most equal to the number of unfiltered detections on Im if there are only clusters containing one detection. |
| $C^{Im}_x$ | A cleaned cluster of detections of the same class x.<br>A cluster is a group of unfiltered detections on an image Im.<br>A cluster contains at least one detection.<br>Cleaned clusters contains at most one detection from each object detector.<br>For instance, the cluster $C^{Im}_x$ may contain the set of detections $\{D_3^{P_2, Im}, D_2^{P_4, Im}\}$.<br>Part 1: Cluster detections - details how unfiltered detections are grouped to form clusters, and how uncleaned clusters are modified to become cleaned clusters. |
| $C_{Im} = \{C^{Im}_1, \ldots, C^{Im}_c\}$ | The set of all cleaned clusters $C^{Im}_x$ on the image Im.<br>The number c depends on the input set of Step 1 unfiltered detections and the clustering method used. c is at most equal to the number of unfiltered detections on Im if there are only clusters containing one detection. |
| $s_{C_x^{Im}}$ | The score of cluster $C^{Im}_x$. The score of a cluster is based on the aggregation of the class confidence scores of all the detections contained in the cluster, for instance<br>$s_{C_x^{Im}} = f^{aggregate}(\{s_3^{P_2, Im}, s_2^{P_4, Im}\})$ for the cluster $C^{Im}_x = \{D_3^{P_2, Im}, D_2^{P_4, Im}\}$.<br>The aggregation method is explained in Part 2: Aggregate scores. |
| $f^{conf}$ | The function $f^{conf}$ takes as input a cluster and returns the ordered set of object detectors it is related to, e.g. $f^{conf}(C^{Im}_x) = \{P_2, P_4\}$ for $C^{Im}_x = \{D_3^{P_2, Im}, D_2^{P_4, Im}\}$. We call this ordered set, the cluster configuration. |
| $s_{P_1}^{step2}, \ldots, s_{P_n}^{step2}, s_{P_1, P_2}^{step2}, \ldots, s_{P_1, P_n}^{step2},$<br>$s_{P_2, P_3}^{step2}, \ldots, s_{P_2, P_n}^{step2}, \ldots, s_{P_1, \ldots, P_n}^{step2}$ | A set of score thresholds for each possible cluster configuration. We call these thresholds cluster configuration thresholds.<br>For instance, for n = 2 object detectors $\{P_1, P_2\}$ there are three cluster configuration thresholds: $\{s_{P_1}^{step2}, s_{P_2}^{step2}, s_{P_1, P_2}^{step2}\}$. |

Figure 4B:
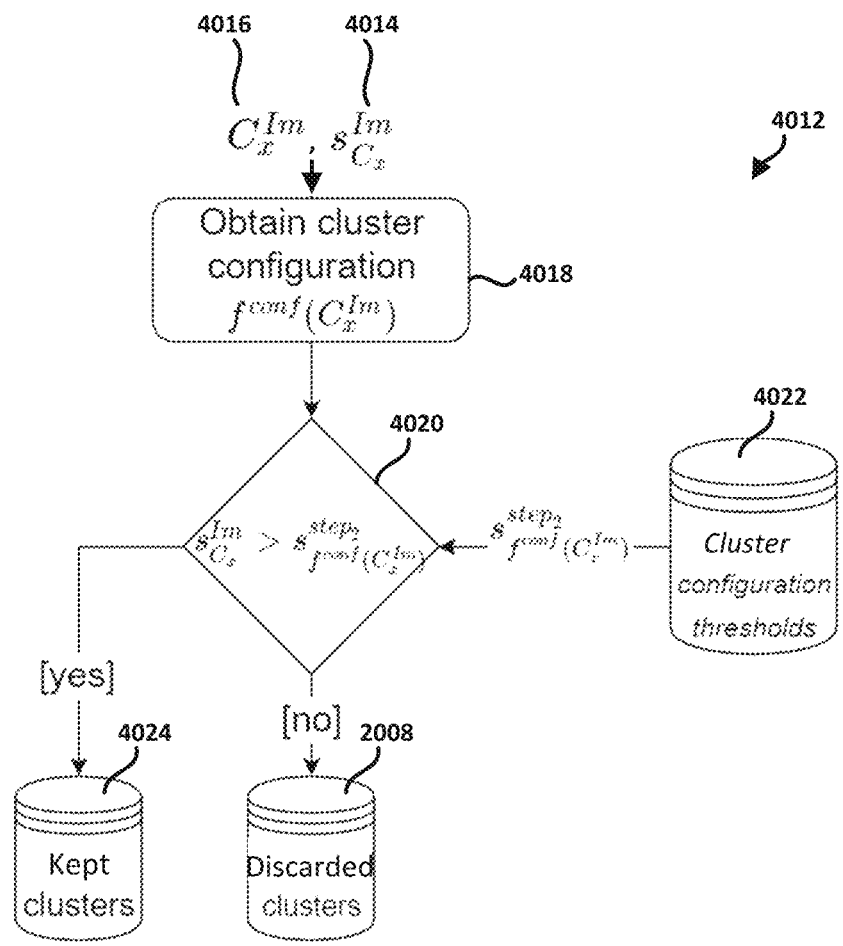
FIG. 4B is a block diagram of further aspects of a computer-implemented method of detecting logos in a graphical rendering, showing further aspects of filtering at prediction time, according to one embodiment.

FIGS. 4A and 4B show Step 2 application at prediction time considering that the input unfiltered detections originate from the same image Im. The different operations that may be performed during Step 2 filtering at prediction time, according to one embodiment.

Part 1: Cluster Detections

In order to filter detections 4002 that have not been rejected or kept after Step 1 filtering, detections may be clustered, as shown at 4004 in FIG. 4A, based on their class and their bounding boxes in order to group all the detections corresponding to the same object in a single cluster. An exemplary clustering algorithm is presented that is configured to output such clusters, according to one embodiment. Other clustering algorithms may be utilized within the scope of the present disclosure. To cluster detections, this algorithm computes a similarity matrix and a clustering method is applied. The following elements are defined:

| | |
|---|---|
| $f^{similarity}$ | The metric to measure the similarity between two detections $D_1$ and $D_2$ defined by their tuples $(cls_1, s_1, b_1)$ and $(cls_2, s_2, b_2)$. The similarity metric takes as input detection tuples and returns a similarity score. |

| | |
|---|---|
| | The similarity metric must be constrained such that two detections with different classes have a similarity score equal to zero.<br>$f^{similarity}$ may be defined as follow:<br>$\begin{cases} f^{overlap}(b_1, b_2) & \text{if } cls_1 = cls_2 \\ 0 & \text{otherwise} \end{cases}$ |
| $M_{Im}$ | The similarity matrix of unfiltered detections on image Im.<br>$M_{Im}$ is built by computing the similarity score with $f^{similarity}$ between all possible pairs of unfiltered detections.<br>Each row and each column of the matrix refers to a unique detection couple $(D_{row}, D_{column})$ from the set of unfiltered detections. The value associated to a couple (row, column) is the similarity score of the related detections, i.e. $M_{Im}(row, column) = f^{similarity}(D_{row}, D_{column})$ |
| $f^{cluster}$ | The clustering algorithm which groups detections. The clustering algorithm takes as input the similarity matrix $M_{Im}$ and returns a set $C_{Im}'$ of uncleaned clusters $C_x'^{Im}$. |

-continued

| $f^{cleaning}$ | As expressed previously, the returned clusters contain only detections of the same class. Different clustering algorithms may be applied such as the DBSCAN algorithm (31). The cleaning function takes as input an uncleaned cluster $C_x^{\prime Im}$ and returns $C_x^{Im}$ such that it contains at most one detection from each object detector. For instance $f^{cleaning}$ may output cluster $C_x^{Im} = \{D_3^{P2,Im}, D_2^{P4,Im}\}$ for the input $C_x^{\prime Im} = \{D_3^{P2,Im}, D_5^{P2,Im}, D_2^{P4,Im}\}$. $f^{cleaning}$ splits a cluster of detections into different groups such that each group contains detections from a unique object detector. For each group one detection is selected. That detection may be, for example, the detection with highest class confidence score. Selected detections from each group form the output cleaned cluster. |
|---|---|

The functions $f^{similarity}, f^{cluster}, f^{cleaning}$ should be defined at parameters settings time. First, the similarity matrix $M_{Im}$ may be computed using the similarity metric $f^{similarity}$ on the set of unfiltered detections resulting from Step 1 on an image Im. Then the chosen clustering algorithm $f^{cluster}$ may be applied to output the set of clusters $C'_{Im}$. Finally, after applying $f^{cleaning}$ on each cluster of the set $C'_{Im}$, a new set $C_{Im}$ may be output such that each cluster from $C_{Im}$ 4006 contains at most one detection from each object detector.

Part 2: Score Clusters

Once the clusters are created, they may be scored based on the detections present in the clusters as well as the performance of the object detectors that made those detections, as suggested in FIG. 4A at 4008. The following is an exemplary scoring algorithm that is configured to score each cluster. Other algorithms may be utilized within the scope of the present disclosure. In order to compute each cluster's score, the following function may be defined:

| $f^{aggregate}$ | An aggregation function that takes as input a cluster and outputs a cluster score (e.g. $s_{C_x}^{Im}$ for the cluster $C_x^{Im} = \{D_3^{P2, Im}, D_2^{P4, Im}\}$), as shown at 4010. Based on the class confidence scores of detections contained in the cluster, e.g. $\{s_3^{P2, Im}, s_2^{P4, Im}\}$ for $C_x^{Im}$, standard aggregation functions may be chosen such as averaging those class confidence scores to compute the cluster score. More complex aggregation functions that takes in account distribution differences between class confidence scores outputted by different object detectors may also be chosen. For instance, calibration methods (32) allow to project scores from different detectors in a common space before aggregating them. |
|---|---|

$f^{aggregate}$ should be defined at parameters setting time. We apply $f^{aggregate}$ on each cluster of the set $C_{Im}$ and associate each cluster to its score before Filter clusters operation.

Part 3: Filter Clusters

After applying $f^{cleaning}$, each cluster contains at most one detection from each object detector. Clusters may then be filtered, as shown at 4012 and FIG. 4B, based on their scores and the object detectors to which they are related.

As shown in FIG. 4B at 4020, a cluster may be filtered by comparing its score to the corresponding cluster configuration threshold. For instance, the score $s_{C_x}^{Im}$ 4014 of cluster $C_x^{Im}$ 4016 is compared to the configuration threshold $s_{fconf(cxim)}^{step2}$, as shown at 4020 with $f^{conf}(C_x^{Im})$ the configuration of $C_x^{Im}$, as shown at 4018. Clusters whose scores are strictly greater than their respective configuration threshold may be kept at 4024 and further processed, while the other clusters may be discarded at 2008 with all their associated detections.

The cluster configuration thresholds 4022 should be determined at parameters setting time. For instance, with all other elements fixed, the combination algorithm on V may be iterated several times with different values of cluster configuration thresholds. The set of values that give the best detection combination on V according to a defined performance metric would be kept at prediction time. According to one embodiment, each threshold may be determined using a hyperparameter optimization method on an annotated object detection dataset. In one embodiment, the hyperparameter optimization may comprise a random search method. Random search is a method to perform hyper-parameter optimization, that is, a method to find close-to-optimal combination of hyper-parameters, for a given model, performance metric and test dataset.

An example of cluster filtering at prediction time is shown below, with reference to FIG. 5, which shows an exemplary phishing message attempting to spoof an image $Im_{aol}$ of an AOL® login page. This example considers the case in which two object detectors (P={$P_1, P_2$}) have been trained on logo detection on documents.

In order to distinguish detection from the object detectors, the following marking conventions may be adopted:

Detections from detector $P_1$ are represented with solid line bounding boxes;

Detections from detector $P_2$ are represented with dotted line bounding boxes;

Clusters are represented with dotted line circles;

Text corresponding to the detections or clusters have been attached to the bounding boxes.

Figure 5:
FIG. 5 is a visualization of detection clusters on an exemplary AOL® login page, according to one embodiment.

In FIG. 5, four clusters may be distinguished, denoted as $C_{Imaol} = \{C_1^{IMaol}, C_2^{Imaol}, C_3^{Imaol}, C_4^{Imaol}\}$ with their respective scores. In this example, the function $f^{aggregate}$ used to compute cluster's score is the average operation.

The table below summarizes the clusters shown in FIG. 5, their score, their configuration and the corresponding configuration score (which have been fixed at parameters setting time based on V):

| Cluster | Detections | Cluster scores | Configuration | Configuration threshold |
|---|---|---|---|---|
| $C_1^{Imaol}$ | $D_1^{P1, Imaol}$ = (AOL ®, 0.87, $b_1^{P1, Imaol}$) $D_1^{P2, Imaol}$ = (AOL ®, 0.95, $b_1^{P2, Imaol}$) | $s_{C_1}^{Imaol}$ = 0.91 | $f^{conf}(C_1^{Imaol})$ = $\{P_1, P_2\}$ | $s_{P_1, P_2}^{step2}$ = 0.3 |
| $C_2^{Imaol}$ | $D_2^{P1, Imaol}$ = (SFR ®, 0.42, $b_2^{P1, Imaol}$) | $s_{C_2}^{Imaol}$ = 0.42 | $f^{conf}(C_2^{Imaol})$ = $\{P_1\}$ | $s_{P_1}^{step2}$ = 0.5 |
| $C_3^{Imaol}$ | $D_2^{P2, Imaol}$ = (WALGREENS ®, 0.77, $b_2^{P2, Imaol}$) | $s_{C_3}^{Imaol}$ = 0.77 | $f^{conf}(C_3^{Imaol})$ = $\{P_2\}$ | $s_{P_2}^{step2}$ = 0.6 |
| $C_4^{Imaol}$ | $D_3^{P1, Imaol}$ = (AOL ®, 0.97, $b_3^{P1, Imaol}$) $D_3^{P2, Imaol}$ = (AOL ®, 0.99, $b_3^{P2, Imaol}$) | $s_{C_4}^{Imaol}$ = 0.98 | $f^{conf}(C_4^{Imaol})$ = $\{P_1, P_2\}$ | $s_{P_1, P_2}^{step2}$ = 0.3 |

Based on the table above, the following clusters may be kept $\{C_1^{Imaol}, C_3^{Imaol}, C_4^{Imaol}\}$ as their respective scores are above their respective configuration scores, while cluster $C_2^{Imaol}$ may be discarded, as its corresponding score 0.42 is below its configuration threshold of 0.5

Part 4: Select Detections

Finally, for each cluster kept 4024 after the previous filtering operation, a single detection may be outputted that represents the object predicted by the detections from that cluster. To do so, the following function 4026 may be defined:

| | |
|---|---|
| $f^{select}$ | The function $f^{select}$ takes a set of detections from an input cluster and returns a unique detection, e.g. for the cluster $C_x^{Im} = \{D_3^{P2,\,Im}, D_2^{P4,\,Im}\}$ it returns a unique detection $D_{selected}^{Cx,\,Im}$. The returned detection is added to the set of kept detections while all other detections from the cluster are discarded. The returned detection has the same class as the detections within the cluster. The returned detection may or may not belong to the input set of detection. For instance, $f^{select}$ may return the detection with highest score or return the average detection from the cluster (average score, average bounding box location). |

The function $f^{select}$ 4026 is defined at parameters setting time. $f^{select}$ is applied on each kept cluster returned by Filter cluster operation. After applying $f^{select}$ all detections are filtered, i.e. kept 2010 or discarded 2008, there are no unfiltered detections left. The kept detections 2010 are returned and form the optimal set of detections 2014.

Exemplary Use Case

Figure 6:
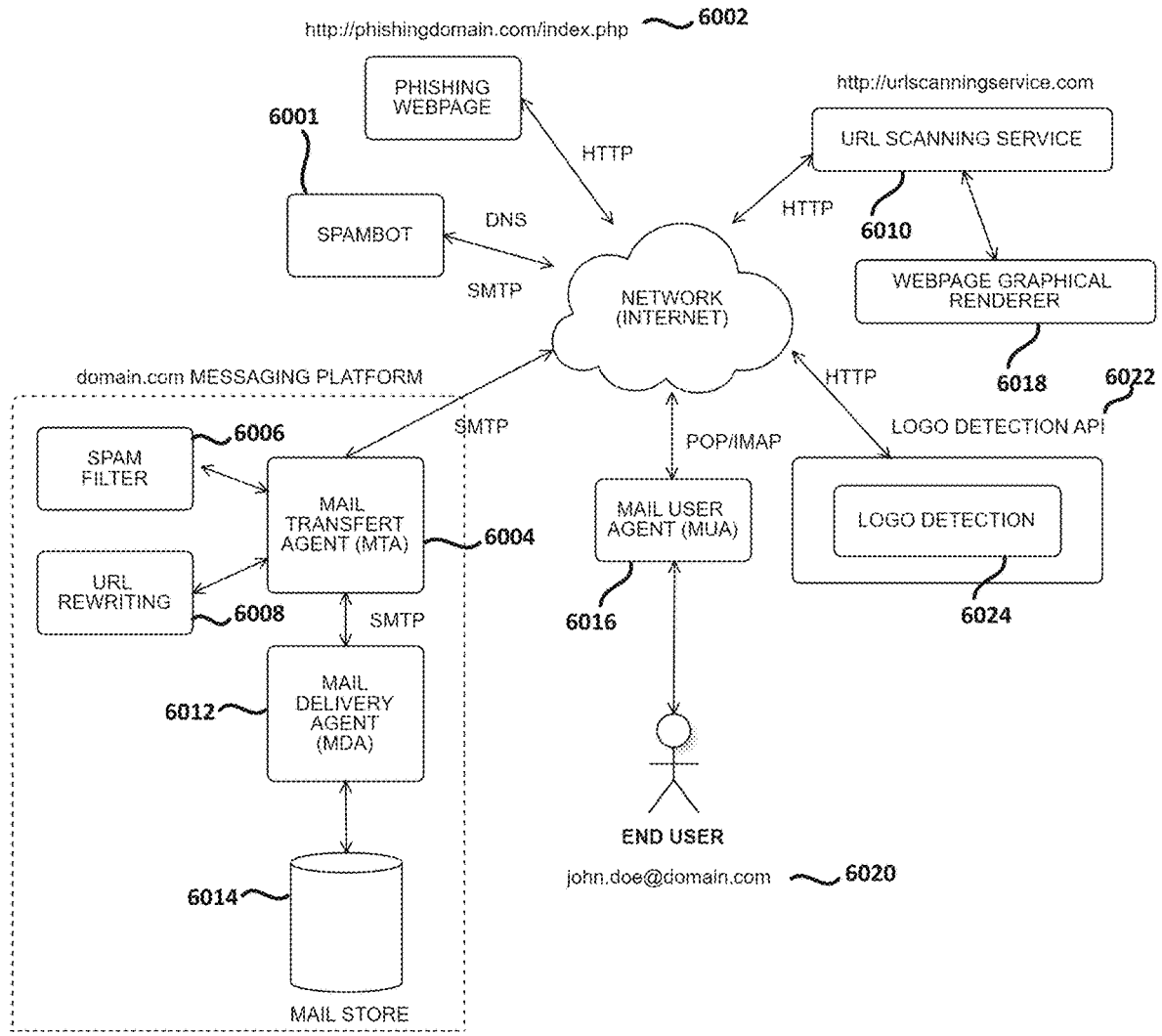
FIG. 6 is a block diagram that illustrates aspects of the present computer-implemented method of logo detection in a graphical rendering of a phishing webpage, according to one embodiment.
Figure 7:
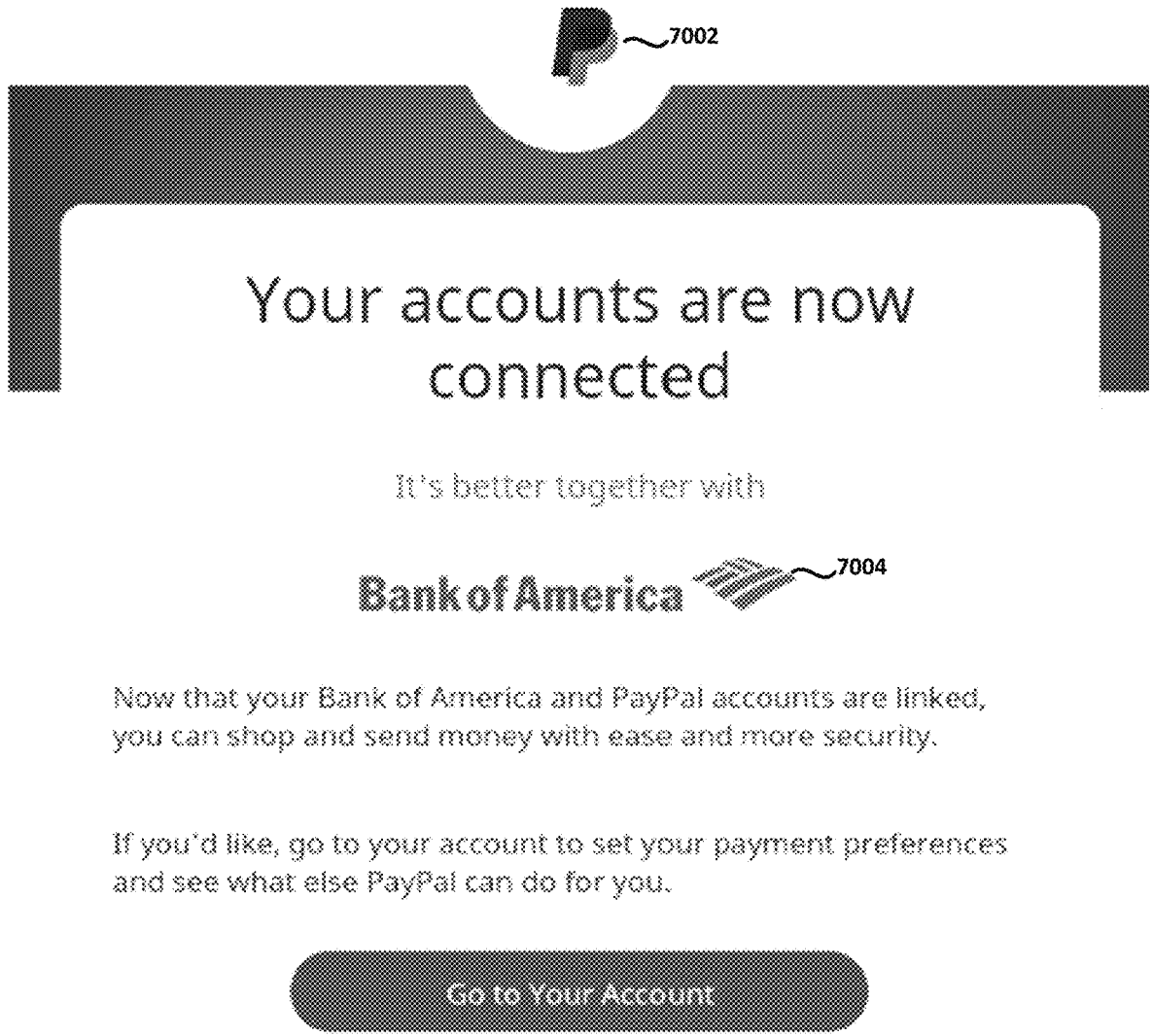
FIG. 7 is a graphical rendering of a phishing webpage.

In this use case, logo detection is used to detect a phishing URL in the context of a Universal Resource Locator (URL) scanning service. See FIG. 6, according to one embodiment. In this use case, the chronology of the events is the following:

1. A spambot 6001 generates a phishing email containing the phishing URL: http://phishingdomain.com/index.php, as shown at 6002. The recipient of the phishing email is john.doe@domain.com, as shown at 6020.
2. In order to send the phishing email to john.doe@domain.com 6020, the spambot 6001 looks up the Domain Naming Server Mail exchanger (DNS MX) record associated to domain.com. The DNS MX record specifies the Mail Transfer Agent (MTA) 6004 responsible for accepting messages on behalf of the domain name.
3. Using Simple Mail Transfer Protocol (SMTP), the spambot 6001 connects to the MTA 6004 specified in the looked-up DNS MX and then sends the content of the phishing email.
4. When the MTA 6004 receives the email, it first applies a spam filter 6006 to detect and block unsolicited emails such as spam, phishing, etc. A large proportion of the unsolicited email traffic is usually detected and blocked, but there are also many unsolicited emails that are not detected and blocked: we consider that the phishing email mentioned in Step 1 is not detected and blocked. For the emails that have not been blocked, the MTA 6004 may then apply a URL rewriting mechanism 6008 to protect the end user at the time of click: the URLs in the phishing email are rewritten so that they point to a URL scanning service 6010 that will analyze the original URL when the end user clicks on a rewritten URL. In this example, http://urlscanningservice.com designates the URL scanning service and http://urlscanningservice.com/url/aHR0cDovL3BoaXNoaW5nZG9tYWluLmNvbS9pbmRleC5waA HA=is the rewriting of http://phishingdomain.com/index.php URL where aHR0cDovL3BoaXNoaW5nZG9tYWluLmNvbS9pbmRleC5waH A=is the encoding of http://phishingdomain.com/index.php in Base64.
5. Using SMTP, the MTA then sends the emails to the Mail Delivery Agent (MDA) 6012.
6. The MDA 6012 stores the email in the Mail Store 6014.
7. The end user john.doe@domain.com 6020 launches his mail client software, also known as Mail User Agent (MUA) 6016. The MUA 6016 fetches new emails from the mail store 6014, typically with POP3 or IMAP protocol. The MDA 6012 usually acts as the POP3 and/or IMAP server. The MUA 6016 fetches the phishing email containing the rewritten phishing URL.
8. The end user opens the phishing email and clicks on http://urlscanningservice.com/url/aHR0cDovL3BoaXNoaW5nZG9tYWluLmNvbS9pbmRleC5waHA=.
9. The URL scanning service 6010 decodes the aHR0cDovL3BoaXNoaW5nZG9tYWluLmNvbS9pbmRleC5waHA=Base64 encoded value. The URL scanning service 6010 then analyzes the http://phishingdomain.com/index.php URL. For this purpose, it extracts features from the URL and associated webpage such as: URL domain DNS information, URL domain WHOIS information, HTML content of the webpage, graphical rendering of the webpage, etc. The URL scanning services then applies one or several algorithms on the features to determine if the URL is a phishing URL. Examples of such algorithms are fingerprints algorithms, decision tree, supervised learning algorithm (SVM, Random Forest and the like), among other detection technologies. In this use case, we consider that the URL scanning service extracts one or several logo(s) from the graphical rendering of the webpage associated to the analyzed URL (FIG. 7 shows an example of a phishing webpage graphical rendering, where the graphical rendering contains two PayPal* logos 7002 and one Bank Of America® logo 7004). As such, the graphical rendering of the webpage is performed by the Webpage Graphical Renderer component 6018. The graphical rendering of the webpage is then sent by the URL scanning service 6010 to an Application Program Interface (API) 6022, via HTTP, of a Logo Detection component 6024 according to an embodiment.
10. Logo Detection API 6022 is a REST API that exposes the Logo Detection function 6024. The Logo Detection function 6024 analyzes the graphical rendering of the webpage and then extracts one or several brand logo(s) using an embodiment of the present computer-implemented method, as shown and described herein. The result is returned to the URL scanning service 6010.
11. The URL scanning service 6010 has extracted all the features from the URL and associated webpage, including the fact that the graphical rendering of the webpage contains one or several known brand logo(s) which is indicative of a potential phishing. The URL scanning service 6010 then applies one or several algorithms on the features and as such determine that the URL is indeed a phishing URL.

12. Consequently, the URL scanning service redirects the end user to a safe webpage indicating that the URL is a phishing URL.

Physical Hardware

FIG. 8 illustrates a block diagram of a computing device with which embodiments may be implemented. The computing device of FIG. 8 may include a bus 801 or other communication mechanism for communicating information, and one or more processors 802 coupled with bus 801 for processing information. The computing device may further comprise a random-access memory (RAM) or other dynamic storage device 804 (referred to as main memory), coupled to bus 801 for storing information and instructions to be executed by processor(s) 802. Main memory (tangible and non-transitory, which terms, herein, exclude signals per se and waveforms) 804 also may be used for storing temporary variables or other intermediate information during execution of instructions by processor 802. The computing device of FIG. 8 may also include a read only memory (ROM) and/or other static storage device 806 coupled to bus 801 for storing static information and instructions for processor(s) 802. A data storage device 807, such as a magnetic disk and/or solid-state data storage device may be coupled to bus 801 for storing information and instructions—such as would be required to carry out the functionality shown and disclosed relative to FIGS. 1-6. The computing device may also be coupled via the bus 801 to a display device 821 for displaying information to a computer user. An alphanumeric input device 822, including alphanumeric and other keys, may be coupled to bus 801 for communicating information and command selections to processor(s) 802. Another type of user input device is cursor control 823, such as a mouse, a trackball, or cursor direction keys for communicating direction information and command selections to processor(s) 802 and for controlling cursor movement on display 821. The computing device of FIG. 8 may be coupled, via a communication interface (e.g., modem, network interface card or NIC) 808 to the network 826.

As shown, the storage device 807 may include direct access data storage devices such as magnetic disks 830, non-volatile semiconductor memories (EEPROM, Flash, etc.) 832, a hybrid data storage device comprising both magnetic disks and non-volatile semiconductor memories, as suggested at 831. References 804, 806 and 807 are examples of tangible, non-transitory computer-readable media having data stored thereon representing sequences of instructions which, when executed by one or more computing devices, implement aspects of the embodiments described and shown herein. Some of these instructions may be stored locally in a client computing device, while others of these instructions may be stored (and/or executed) remotely and communicated to the client computing over the network 826. In other embodiments, all of these instructions may be stored locally in the client or other standalone computing device, while in still other embodiments, all of these instructions are stored and executed remotely (e.g., in one or more remote servers) and the results communicated to the client computing device. In yet another embodiment, the instructions (processing logic) may be stored on another form of a tangible, non-transitory computer readable medium, such as shown at 828. For example, reference 828 may be implemented as an optical (or some other storage technology) disk, which may constitute a suitable data carrier to load the instructions stored thereon onto one or more computing devices, thereby re-configuring the computing device(s) to one or more of the embodiments described and shown herein. In other implementations, reference 828 may be embodied as an encrypted solid-state drive. Other implementations are possible.

Embodiments of the present invention are related to the use of computing devices for combining detection models, as shown and described herein. According to one embodiment, the methods, devices and systems described herein may be provided by one or more computing devices in response to processor(s) 802 executing sequences of instructions, embodying aspects of the computer-implemented methods shown and described herein, contained in memory 804. Such instructions may be read into memory 804 from another computer-readable medium, such as data storage device 807 or another (optical, magnetic, etc.) data carrier, such as shown at 828. Execution of the sequences of instructions contained in memory 804 causes processor(s) 802 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

Accordingly, one embodiment is a computer-implemented method of detecting logos in a graphical rendering, comprising detecting, using a first trained object detector, logos in the graphical rendering and outputting a first list of detections; detecting, using a second trained object detector, logos in the graphical rendering and outputting a second list of detections; filtering, using a first and a second prior performance-based filter, the received first and second lists of detections into a first group of kept detections, a second group of discarded detections and a third group of detections; clustering detections in the third group of detections, if any, in at least one cluster comprising detections that are of a same class and that are generally co-located within the electronic image; assigning a cluster score to each cluster; and outputting a set of detections of logos in the graphical rendering, the set comprising the detections in the first group and a detection from each of the clusters whose assigned cluster score is greater than a respective threshold. Each threshold may be specific to a set of one or more of the first and second trained object detectors.

According to further embodiments, the first and/or second trained object detectors may comprise a convolution neural network (CNN)-based detector. The CNN-based detector may comprise one of SSD ResNet-50 and SSD VGG-16, for example. Each detection in the first to third groups of detections may comprise a tuple comprising a predicted class, a class confidence score and coordinates of a bounding box of a detected logo in the graphical rendering. According to one embodiment, filtering further may comprise: generating the first prior performance-based filter by testing the first trained object detector on a first annotated object detection dataset; and generating the second prior performance-based filter by testing the second trained object detector on a second annotated object detection dataset.

The first annotated object detection dataset and the second annotated object detection dataset may be the same. In one embodiment, filtering may be based on: a first prior knowledge value specific to the first trained object detector and a first confidence score associated with each detection in the first list of detections; and a second prior knowledge value specific to the second trained object detector and a second confidence score associated with each detection in the second list of detections. The first group of kept detections may comprise detections that are to be included in the outputted set of detections of logos, the second group of discarded detections may comprise detections that are discarded and not included in the outputted set of detections of logos; and the third group may comprise detections that require further processing to determine whether they are to be discarded into the second group or included in the first group. In one embodiment, clustering detections in the third group of detections that are generally co-located within the electronic image may comprise clustering detections that have overlapping bounding boxes within the electronic image. Clustering detections that have overlapping bounding boxes within the electronic image may comprise clustering detections that have bounding boxes whose Intersection Over Union (IoU) is greater than an overlapping threshold. According to one embodiment, assigning a cluster score to each cluster may comprise calculating the cluster score based on the confidence scores of the detections in the cluster for which the cluster score is being calculated. Calculating the cluster score may comprise using an aggregation function. For each cluster, the cluster score may comprise an average of the confidence scores of the detections in the cluster.

In one embodiment, the computer-implemented method may further comprise determining each threshold using a hyperparameter optimization method on an annotated object detection dataset. The hyperparameter optimization method may comprise, for example, a random search method. The computer-implemented method may further comprise denoting each cluster having a cluster score that is greater than a predetermined cluster threshold as a pertinent cluster that is associated to a single detection that represents the cluster. In one embodiment, the single detection representing the cluster is one of the detections contained in the cluster. The computer-implemented method may further comprise adding pertinent clusters to the first group of kept detections.

Another embodiment is a computing device that may comprise at least one processor; at least one data storage device coupled to the at least one processor; a network interface coupled to the at least one processor and to a computer network and a plurality of processes spawned by the at least one processor to detect logos in a graphical rendering. The processes may include processing logic for: detecting, using a first trained object detector, logos in the graphical rendering and outputting a first list of detections; detecting, using a second trained object detector, logos in the graphical rendering and outputting a second list of detections; filtering, using a first and a second prior performance-based filter, the received first and second lists of detections into a first group of kept detections, a second group of discarded detections and a third group of detections; clustering detections in the third group of detections, if any, in at least one cluster comprising detections that are of a same class and that are generally co-located within the electronic image; assigning a cluster score to each cluster; and outputting a set of detections of logos in the graphical rendering, the set comprising the detections in the first group and a detection from each of the clusters whose assigned cluster score is greater than a respective threshold.

According to one embodiment, at least one of the first and second trained object detectors may comprise a convolution neural network (CNN)-based detector. The CNN-based detector may comprise one of SSD ResNet-50 and SSD VGG-16, for example. Each detection in the first to third groups of detections may comprise a tuple comprising a predicted class, a class confidence score and coordinates of a bounding box of a detected logo in the graphical rendering. The processing logic for filtering further may comprise processing logic for: generating the first prior performance-based filter by testing the first trained object detector on a first annotated object detection dataset; and generating the second prior performance-based filter by testing the second trained object detector on a second annotated object detection dataset. In one embodiment, the first annotated object detection dataset and the second annotated object detection dataset are the same.

According to one embodiment, filtering may be based on: a first prior knowledge value specific to the first trained object detector and a first confidence score associated with each detection in the first list of detections; and a second prior knowledge value specific to the second trained object detector and a second confidence score associated with each detection in the second list of detections. The first group of kept detections may comprise detections that are to be included in the outputted set of detections of logos; the second group of discarded detections may comprise detections that are discarded and not included in the outputted set of detections of logos; and the third group may comprise detections that require further processing to determine whether they are to be discarded into the second group or included in the first group. The processing logic for clustering detections in the third group of detections that are generally co-located within the electronic image may comprise processing logic for clustering detections that have overlapping bounding boxes within the electronic image. The processing logic for clustering detections that have overlapping bounding boxes within the electronic image may comprise processing logic for clustering detections that have bounding boxes whose Intersection Over Union (IoU) may be greater than an overlapping threshold.

In one embodiment, the processing logic for assigning a cluster score to each cluster may comprise processing logic for calculating the cluster score based on the confidence scores of the detections in the cluster for which the cluster score may be being calculated. The processing logic for calculating the cluster score may comprise processing logic for using an aggregation function. For each cluster, the cluster score may comprise an average of the confidence scores of the detections in the cluster. Each threshold may be specific to a set of one or more of the first and second trained object detectors.

The computing device, according to one embodiment, may further comprise processing logic for determining each threshold using a hyperparameter optimization method on an annotated object detection dataset. The hyperparameter optimization method may comprise a random search method. Processing logic may also be provided for denoting each cluster having a cluster score that is greater than a predetermined cluster threshold as a pertinent cluster that is associated to a single detection that represents the cluster. The single detection representing the cluster may be one of the detections contained in the cluster. Processing logic may be provided for adding pertinent clusters to the first group of kept detections.

Portions of the detailed description above describe processes and symbolic representations of operations by computing devices that may include computer components, including a local processing unit, memory storage devices for the local processing unit, display devices, and input devices. Furthermore, such processes and operations may utilize computer components in a heterogeneous distributed computing environment including, for example, remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements. Moreover, the computer-implemented methods disclosed herein improve the functioning of computers by enabling the migration of filesystems from a donor filesystem to a beneficiary filesystem while commands are issued and executed to change the metadata and data thereof. Such computer-implemented methods are not capable of being effectively carried out by the mental processes of humans.

A process, such as the computer-implemented methods described and shown herein, may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering and the like. The operations described herein are machine operations performed in conjunction with various input provided by a human or artificial intelligence agent operator or user that interacts with the computer. The machines used for performing the operations described herein include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose hardware machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

While certain example embodiments have been described, these embodiments have been presented by way of example only, and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method for detecting phishing electronic messages, comprising:
   receiving an electronic message comprising a Uniform Resource Locator (URL);
   applying a URL rewriting mechanism to the URL in the received electronic message such that the URL in the received electronic message is rewritten to point to a URL scanning service;
   upon receiving a request from an end user having opened the electronic message for the webpage pointed to by the rewritten URL, generating a graphical rendering of a webpage pointed to by the URL of the received electronic message;
   detecting at least one logo in the generated graphical rendering using a plurality of trained object detectors and successively filtering logo detections output by the plurality of trained object detectors using prior-performance-based filtering followed by score-based filtering, the prior performance-based filtering comprising using a first and a second prior performance-based filter to filter the logo detections output by the plurality of trained object detectors into a first group of kept detections, a second group of discarded detections and a third group of detections requiring further processing to determine whether they are to be discarded into the second group or included in the first group;

returning the detected at least one logo to the URL scanning service;

determining whether the detected at least one logo is a well-known logo indicative of a phishing attempt; and redirect the end user to a safe webpage indicating that the URL in the received electronic message is a phishing URL and that the received electronic message is a phishing electronic message when the URL in the received electronic message is likely a phishing URL and the detected logo is determined to be a well-known logo that is indicative of a phishing attempt.

2. The computer-implemented method of claim 1, wherein at least one of the plurality of trained object detectors comprises a convolution neural network (CNN)-based detector.

3. The computer-implemented method of claim 2, wherein the CNN-based detector comprises one of SSD ResNet-50 and SSD VGG-16.

4. The computer-implemented method of claim 1, further comprising clustering detections in the third group of detections in at least one cluster comprising detections that are of a same class and that are generally co-located within the graphical rendering.

5. The computer-implemented method of claim 1, wherein the score-based filtering comprises assigning a cluster score to each cluster and outputting a set of detections of logos comprising the detected at least one logo in the graphical rendering, the set comprising the detections in the first group and a detection from each of the clusters whose assigned cluster score is greater than a respective threshold.

6. The computer-implemented method of claim 1, wherein the prior-performance-based filtering comprises:
   generating a first prior performance-based filter by testing a first trained object detector on a first annotated object detection dataset;
   generating a second prior performance-based filter by testing a second trained object detector on a second annotated object detection dataset, and
   prior-performance-based filtering the logo detections output by the plurality of trained object detectors using the generated first and second prior performance-based filters.

7. The computer-implemented method of claim 6, wherein the first annotated object detection dataset and the second annotated object detection dataset are the same.

8. The computer-implemented method of claim 1, wherein detecting further comprises clustering detections that are generally co-located within the graphical rendering by determining detections that have overlapping bounding boxes within the graphical rendering.

9. The computer-implemented method of claim 8, wherein clustering detections that have overlapping bounding boxes within the graphical rendering comprises clustering detections that have bounding boxes whose Intersection Over Union (IoU) is greater than an overlapping threshold.

10. A computing device comprising:
    at least one processor;
    at least one data storage device coupled to the at least one processor;
    a network interface coupled to the at least one processor and to a computer network;
    the at least one processor being configured to detect logos in a graphical rendering using a plurality of processes, the processes including processing logic for:
       receiving an electronic message comprising a Uniform Resource Locator (URL);
       applying a URL rewriting mechanism to the URL in the received electronic message such that the URL in the received electronic message is rewritten to point to a URL scanning service;
       upon receiving a request from an end user having opened the electronic message for the webpage pointed to by the rewritten URL, generating a graphical rendering of a webpage pointed to by the URL of the received electronic message;
       detecting at least one logo in the generated graphical rendering using a plurality of trained object detectors and successively filtering logo detections output by the plurality of trained object detectors using prior-performance-based filtering followed by score-based filtering, the prior performance-based filtering comprising using a first and a second prior performance-based filter to filter the logo detections output by the plurality of trained object detectors into a first group of kept detections, a second group of discarded detections and a third group of detections requiring further processing to determine whether they are to be discarded into the second group or included in the first group;
       returning the detected at least one logo to the URL scanning service;
       determining whether the detected at least one logo is a well-known logo indicative of a phishing attempt; and
       redirect the end user to a safe webpage indicating that the URL in the received electronic message is a phishing URL and that the received electronic message is a phishing electronic message when the URL in the received electronic message is likely a phishing URL and the detected logo is determined to be a well-known logo that is indicative of a phishing attempt.

11. The computing device of claim 10, wherein at least one of the plurality of trained object detectors comprises a convolution neural network (CNN)-based detector.

12. The computing device of claim 11, wherein the CNN-based detector comprises one of SSD ResNet-50 and SSD VGG-16.

13. The computing device of claim 10 further comprising processing logic for clustering detections in the third group of detections in at least one cluster comprising detections that are of a same class and that are generally co-located within the graphical rendering.

14. The computing device of claim 10, wherein the score-based filtering comprises assigning a cluster score to each cluster and outputting a set of detections of logos comprising the detected at least one logo in the graphical rendering, the set comprising the detections in the first group and a detection from each of the clusters whose assigned cluster score is greater than a respective threshold.

15. The computing device of claim 10, wherein the prior-performance-based filtering comprises:
    generating a first prior performance-based filter by testing a first trained object detector on a first annotated object detection dataset;
    generating a second prior performance-based filter by testing a second trained object detector on a second annotated object detection dataset, and
    prior-performance-based filtering the logo detections output by the plurality of trained object detectors using the generated first and second prior performance-based filters.

16. The computing device of claim 15, wherein the first annotated object detection dataset and the second annotated object detection dataset are the same.

17. The computing device of claim 10, wherein detecting further comprises clustering detections that are generally co-located within the graphical rendering by determining detections that have overlapping bounding boxes within the graphical rendering.

18. The computing device of claim 17, wherein clustering detections that have overlapping bounding boxes within the graphical rendering comprises clustering detections that have bounding boxes whose Intersection Over Union (IoU) is greater than an overlapping threshold.

\* \* \* \* \*